United States Patent [19]

Staerzl

[11] 4,243,009
[45] Jan. 6, 1981

[54] DETONATION CONTROL APPARATUS FOR OUTBOARD MOTOR

[75] Inventor: Richard E. Staerzl, Fond du Lac, Wis.

[73] Assignee: Brunswick Corporation, Skokie, Ill.

[21] Appl. No.: 79,425

[22] Filed: Sep. 27, 1979

[51] Int. Cl.³ .................... F02B 33/00; F02M 17/00
[52] U.S. Cl. ................................... 123/435; 123/479
[58] Field of Search ......... 123/117 R, 119 ED, 119 R

[56] References Cited
U.S. PATENT DOCUMENTS

| 2,401,563 | 6/1946 | Hersey | 123/119 ED |
|---|---|---|---|
| 2,467,732 | 4/1949 | Davis | 123/119 ED |
| 2,595,524 | 5/1952 | Henneman | 123/119 ED |
| 2,958,317 | 11/1960 | McNally | 123/119 ED |
| 4,116,173 | 9/1978 | McDougal | 123/119 ED |
| 4,116,175 | 9/1978 | Sand | 123/119 ED |

Primary Examiner—Ronald B. Cox
Attorney, Agent, or Firm—Lewis L. Lloyd

[57] ABSTRACT

Detonation (knock) control apparatus for an internal combustion engine, such as an outboard motor, comprises a transducer for sensing detonation and for providing a signal when detonation occurs to an electronic controller which then operates an electrically controllable valve to enrich the fuel/air mixture to the engine to thereby reduce detonation. The electronic controller is fail-safe and is responsive to loss of signal from the sensing device and to electrical power supply failure to operate the valve to enrich the mixture.

5 Claims, 6 Drawing Figures

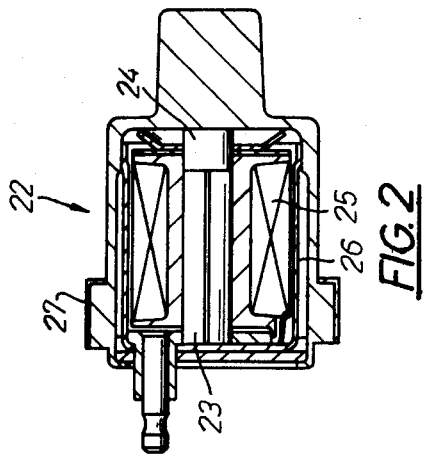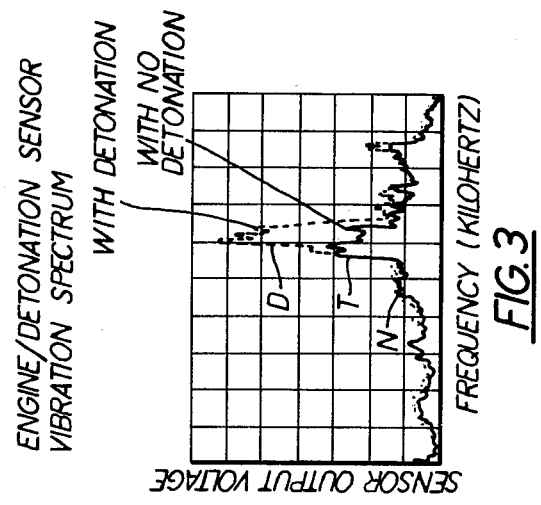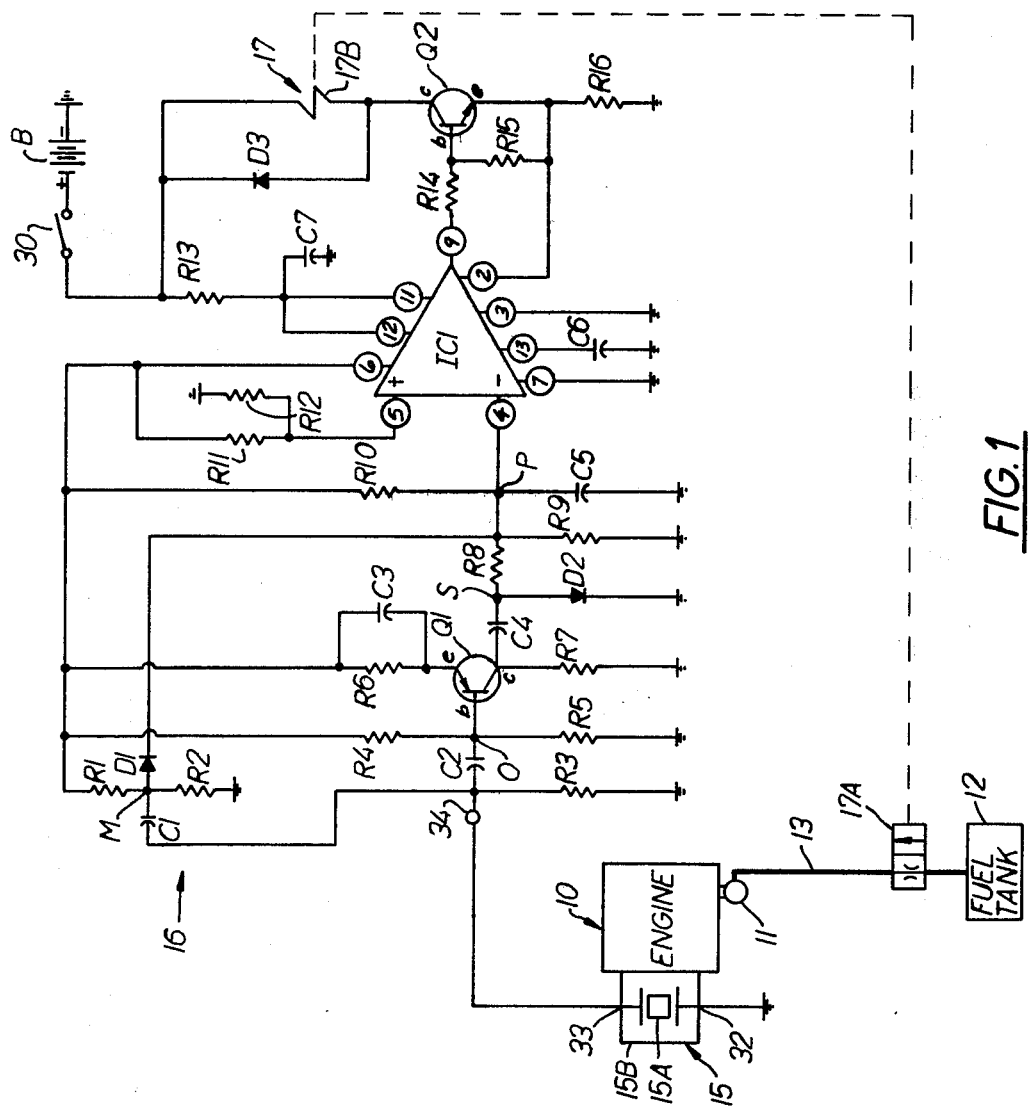

DETONATION CONTROL APPARATUS FOR OUTBOARD MOTOR

BACKGROUND OF THE INVENTION

1. Field of Use

This invention relates generally to detonation control apparatus for an internal combustion engine, such as an outboard motor. In particular, it relates to detonation control apparatus which employs an electronic controller responsive to electric signals from a detonation (knock) sensing device to control a valve which regulates the fuel/air mixture to the engine to thereby control knock.

2. Description of the Prior Art

Premature firing of the fuel/air mixture in the cylinders of an internal combustion engine causes the mixture to explode rather than burn smoothly and this phenomena, called detonation or knock, results in loss of power and possible engine damage. Detonation occuring in large outboard motors, resulting from increases in engine speed from idling to cruise or beyond, can be reduced to some extent by adjusting engine ignition timing, i.e., by advancing the timing or spark as engine speed is increased. Typically, this is accomplished by means of a mechanical linkage connected between the engine throttle and an adjustably positionable trigger coil in the ignition system, or by means of some type of electrical or electronic spark advance control means responsive to engine speed. A technical paper No. 780155 entitled "Reduction of Octane Requirement By Knock Sensor Spark Retard System" published February 27-March 3, 1978 by the Society of Automotive Engineers, Inc. discloses an electronic spark advance control means, as does a paper No. 780413 published on the same dates by SAE.

SUMMARY OF THE INVENTION

The present invention provides detonation (knock) control apparatus for an internal combustion engine, such as a large multicylinder outboard motor, which controls detonation through fuel enrichment (increase of fuel or decrease of air in the fuel/air mixture) to the engine cylinders when detonation occurs.

The control apparatus in accordance with the invention generally comprises a known type of detonation transducer, mounted on or near the engine, for sensing the presence or absence of detonation and for providing electrical output signals related thereto, an electronic controller for receiving and processing such output signals, and an electrically controllable adjustable valve means connected to regulate or control the fuel/air mixture supply system for the engine and controlled by the electronic controller. The valve means may control either the rate of fuel flow, the rate of air flow, or both, and has the effect of enriching or leaning the fuel/air mixture to the engine, as required. The electronic controller operates the valve means so as to maintain a normal predetermined fuel/air mixture ratio flowing to the engine when the engine is running at speeds at which detonation is below a predetermined magnitude and further operates the valve means so as to enrich the fuel/air mixture (i.e., increase fuel flow or decrease air flow) above the predetermined level when detonation or knock magnitude reaches or exceeds the predetermined magnitude. The electronic controller also operates the valve means to enriches the mixture flowing to the engine in the event of loss of electrical signal from the detonation transducer or in the event of loss of electrical power to the controller or to the electrically controllable valve means.

The detonation transducer provides an alternating current output signal whose voltage (amplitude) increases in response to increases in the magnitude (amplitude) of engine detonation vibrations, and may, for example, take the form of a piezo-electric crystal type transducer or a variable flux density magnetic type transducer.

The electrically controllable adjustable valve means may take several forms. For example, the valve means may include a valve located in or associated with the fuel line to the carburetor or could be located within the carburetor itself to control either fuel or air or both. If a fuel-injected engine is employed, the fuel injector valves themselves, suitably modified so as to be electrically operable, could serve as the adjustable valve means. Furthermore, the valve has at least two positions, one of which provides a richer fuel/air mixture ratio to the engine cylinders than the other position. In one preferred embodiment disclosed in detail herein, a two position (partially open, fully open) solenoid (on-off) valve is employed in the exterior fuel supply line to the carburetor and the valve assumes fully open position when the solenoid is off (de-energized). When fully open, fuel flow increases to thereby enrich the fuel/air mixture supplied to the engine cylinder.

The electronic controller generally comprises a valve control circuit for operating the electrically controllable adjustable valve means; an operational amplifier circuit providing an output signal for actuating the valve control circuit; and input circuits for the operational amplifier including: a detonation sensing circuit connected to the detonation transducer for sensing the absence or presence of detonation and for causing the operational amplifier to maintain a normal fuel/air mixture flow when detonation is below a predetermined magnitude and to increase the ratio of fuel in the mixture (i.e., enrichen the mixture) when detonation is at or above predetermined magnitude; a signal loss sensing circuit connected to the detonation transducer for causing the operational amplifier to increase the ratio of fuel (i.e., enrichen the mixture) when the detonation transducer fails to produce output signals; and means for causing the operational amplifier to increase the ratio of fuel (i.e., enrichen the mixture) when the power supply is lost or fails. The signal loss sensing circuit and the last-recited means provide for fail-safe operations of the control apparatus.

The electronic controller may, for example, depending on the type valve and valve control circuit employed, be suitably designed or adapted to provide a digital on-off output signal, or a proportional analog output signal, or frequency or pulse-width modulated output signals.

Detonation control apparatus in accordance with the invention offers several advantages over the prior art. For example, the apparatus employs relatively low cost commercially available standard components in a relatively non-complex arrangement and is reliable in use, both as regards reducing detonation and protecting the engine in the event of apparatus failure. The apparatus lends itself to a wide variety of embodiments and applications. The apparatus, except for the valve, is essentially non-mechanical and eliminates the need for complex mechanical linkages which cannot be relied on to operate consistently in connection with accurate degrees of engine-timing regulation.

Other objects and advantages will hereinafter appear, reference being had to the accompanying drawings.

DESCRIPTION OF THE DRAWINGS

FIG. 1 is a schematic diagram of detonation control apparatus in accordance with the invention and includes an electrical circuit diagram of one embodiment of the invention;

FIG. 2 is an enlarged cross-sectional view of another embodiment of a detonation transducer shown schematically in FIG. 1;

FIG. 3 is a graph depicting the typical output characteristics of the transducers shown in FIGS. 1 and 2;

DESCRIPTION OF THE PREFERRED EMBODIMENT

Figure 4:
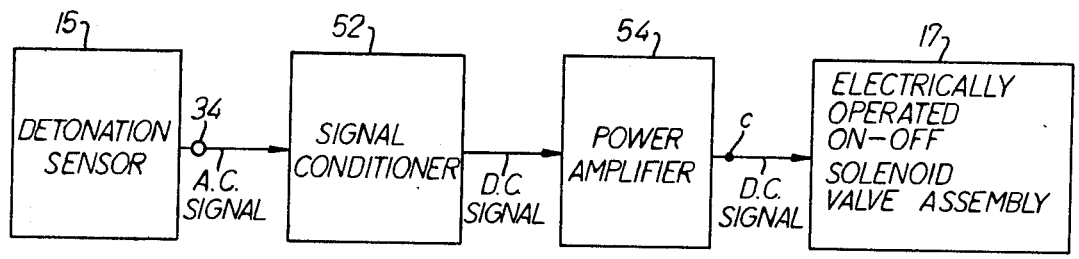
FIG. 4 is a block diagram of the embodiment of the invention shown in FIG. 1.

FIG. 1 shows in schematic form an internal combustion engine 10, such as a large multicylinder outboard motor, whose cylinders are supplied with a combustible mixture of fuel, such as gasoline, and air from a carburetor 11 which is supplied with fuel from a fuel tank 12 by means of a fuel supply line 13.

FIG. 1 also shows in diagrammatic form one embodiment of detonation control apparatus in accordance with the invention, and which generally includes a detonation transducer 15, an electronic controller 16, and an electrically controllable adjustable fuel flow control valve assembly 17.

Valve assembly 17 includes a valve 17A which is connected in fuel supply line 13 and an electrical actuator 17B, such as a solenoid coil, for the valve. Valve 17A is a two-position (partially open, fully open) valve which is maintained in fully open position when solenoid coil 17B is de-energized and assumes partially open position when the solenoid coil is energized. When valve 17A is partially open, fuel flow to carburetor 11 is at a predetermined flow rate (i.e., normal) and when the valve is fully open, fuel flow to the carburetor increases, thereby enrichening the fuel/air mixture to the engine 10. As will be understood, an enriched mixture to the cylinders of engine 10 when detonation or knock occurs has the effect of substantially reducing or eliminating detonation or knock.

Detonation transducer 15, shown schematically in FIG. 1, is a known type of device which is used to pick up vibrations of the engine 10 and convert them into electric output signals. Transducer 15 includes a quartz piezo-electric crystal 15A within a housing 15B which is attached, as by epoxy, onto a metal surface of engine 10 and may be mounted at various locations, such as on a cylinder head or intake manifold, or any other location whereat it detects detonation vibrations most consistently and does not amplify or reduce the vibration input from any one cylinder. One electrical terminal 32 of transducer 15 is grounded and the other terminal 33 is connected to a controller input terminal 34, hereinafter described. When engine 10 is not running, transducer 15 produces no output signal and valve 17A is fully open. When engine 10 is being started or is running at relatively low speeds whereat no (or low) detonation occurs, the engine cranking noise or normal engine running noise, respectively, cause transducer 15 to produce a relatively low voltage signal and valve 17A is partially open. When engine 10 is running at relatively high speeds whereat detonation magnitude (amplitude) is at or reaches a predetermined magnitude, a relatively high voltage output signal is produced by transducer 15 and valve 17A is fully open. FIG. 3 is a graph depicting a representative trace, designated D, of the frequency spectrum of the electric output signal of transducer 15 when engine 10 is running at high speed and detonation is occurring. In the graph, the output voltage of the transducer 15 is plotted against frequency and, as appears therein, some vibrations sensed and designated trace N, such as those caused by normal cylinder firing, valve closing and push rod operation, appear as background noise, and, when detonation occurs, as the line D shows, sensor output voltage increases substantially over the normal engine firing signal trace T, for example, to one to two volts over millivolt background noise signals at the frequency range of approximately 5 kilohertz ($KH_z$). Filters (not shown) tuned to this frequency, may be provided to optimize recognition of the detonation or knock signals. It is known that most detonation pulses last for a period of about three milliseconds and occur approximately 360° apart for the same cylinder in two cycle engines.

If preferred, transducer 15 may take the form of the magnetic type device 22 shown in FIG. 2, instead of the crystal type device shown in FIG. 1, but device 22 would operate in substantially the same manner as regards detonation vibration input and electric signal output. Device 22 is a magnetic-structure device comprising a high nickel alloy core 23, a permanent magnet 24, a coil 25, an inner shell 26, and a housing 27. Engine knock vibrations transmitted to core 23 cause a flux density change which results in a voltage being generated in the coil 25 to thereby provide an output signal.

The electronic controller 16, which receives input signals from detonation transducer 15 and effects operation of valve assembly 17, generally operates as follows. When the engine 10 is not running, transducer 15 provides no output signal and valve 17A is fully open. When engine 10 is being started or running at low and medium speeds, for example, transducer 15 provides a signal indicative of normal engine operation (curve T in FIG. 3), valve 17A is partially closed and fuel supply is normal. When engine 10 runs at relatively high speeds and detonation occurs, transducer 15 provides a signal indicative of detonation (curve D in FIG. 3), valve 17A is open and fuel supply is increased. When transducer 15 provides no signal (or one below a predetermined low value) indicative of transducer failure, valve 17A is open and fuel supply is increased. When the power supply to electric controller 16 fails (or is turned off), valve 17A is open (regardless of any signals from transducer 15) and fuel supply is increased.

Broadly considered, electronic controller 16 comprises the following circuits, namely: a valve control circuit including a transistor Q2 for operating the electrically controllable adjustable valve assembly 17; an operational amplifier circuit including an operation amplifier device IC1 for providing an output signal for actuating the valve control circuit; and input circuits for the operational amplifier circuit. The input circuits include a detonation sensing circuit connected to detonation transducer 15 for sensing the absence or presence of detonation and for causing the operational amplifier IC1 to maintain normal (reduced) fuel flow when detonation is below a predetermined magnitude and to increase fuel flow when detonation is at or above a predetermined magnitude; a signal loss sensing circuit including a transistor Q1 connected to the detonation transducer 15 for causing the operational amplifier IC1 to increase fuel flow when the detonation transducer 15 fails to provide a minimum output signal; and means providing fail safe operation and including a resistor R3 to provide impedance loading of transducer 15 for causing the operational amplifier IC1 to increase fuel flow when the power supply to the controller 16 fails or is turned off.

More specifically, electronic controller 16 and solenoid coil 17B are energizable from a suitable electrical power source, such as a battery B, through a single pole single throw master switch 30. The negative terminal of battery B is connected to ground and the positive terminal of the battery is connected to one side of switch 30.

The operational amplifier IC1 takes the form of a high gain linear inverting integrated circuit such as a Motorola Type MC 1723 or Texas Instrument UA723CN device. Device IC1 has an output terminal 9, a negative inverting input terminal 4 whose polarity is reversed at output terminal 9, and a positive non-inverting input terminal 5. When the positive input voltage on input terminal 5 is higher than the negative input voltage on terminal 4, there is a positive output voltage at output terminal 9 and the amplifier IC1 is on. Conversely, when the negative input voltage on input terminal 4 is higher than the positive input terminal 5, the output voltage at output terminal 9 drops to zero and the amplifier IC1 is off.

The positive terminal of battery B is connectible through switch 30 to power supply terminals 11 and 12 of amplifier IC1 and the terminals 3 and 7 of the amplifier are grounded. A resistor R13 is in series with amplifier terminals 11 and 12 and one side of resistor R13 is grounded through a capacitor C7. Resistor R13 is used to limit current in the event of reverse battery polarity and also forms part of an R-C network with capacitor C7 for RFI noise suppression on the B+ battery voltage. The output terminal 9 of amplifier IC1 is connected to the valve control circuit; namely, to the base terminal b of an NPN power or switching transistor Q2, and the emitter-collector terminals e and c of transistor Q2 are connected in series circuit with solenoid coil 17B of the solenoid valve 14 across the power supply, i.e., between switch 30 and a resistor R16 which is grounded. A free-wheeling diode D3 is connected across solenoid coil 17B. When output terminal 9 of amplifier IC1 is off, base terminal b of transistor Q2 is also off and solenoid coil 15 is de-energized to cause valve 14A to assume its fully open condition and increase fuel flow (i.e., enrichen the mixture). Conversely, when output terminal 9 is on, base terminal b is also on, solenoid coil 15 is energized, and valve 14A assumes its partially open condition to decrease fuel to normal conditions.

The positive non-inverting input terminal 5 of amplifier IC1 is connected to a positive biasing circuit, namely, to a voltage divider circuit including resistors R11 and R12 which are connected in series with each other across the reference voltage source, i.e., between pin 6 of device IC1 and ground. When the controller 16 is energized and detonation is not occurring (but a low level signal is present at 34), input terminal 5 of amplifier IC1 is maintained at a higher positive voltage relative to the negative voltage on input terminal 4 and output terminal 9 is on. Thus, coil 17B is energized and valve 17A is closed. The value of the resistors R11 and R12 determine the detonation detection level.

The negative inverting input terminal 4 of amplifier IC1 is connected to receive inputs from three sources. Specifically, terminal 4 is connected to a point P in circuit between a voltage dropping resistor R10 and a capacitor C5 which are series connected across the reference voltage sources, i.e., between pin 6 and ground. Capacitor C5 insures a smooth voltage level on terminal 4 of amplifier IC1.

Terminal 4 (point P) is also connected to receive input signals from two sources, namely, from the detonation sensing circuit and from the signal loss sensing circuit.

The detonation sensing circuit or coupler circuit which is connected between detonation transducer terminal 34 and point P, includes a capacitor C1, a forward biasing diode D1, and a pair of resistors R1 and R2. The resistors R1 and R2 are connected in series with each other to form a voltage divider network across the reference voltage source, i.e., between pin 6 and ground, and the capacitor C1 and the diode D1 are connected to a point M therebetween. Detonation sensitivity is determined by the values of the resistors R1 and R2. The greatest sensitivity is produced when the voltage level at point M is slightly below forward threshold voltage of diode D1. The response time of the controller is controlled or determined by the value of the Capacitor C6, which is connected between terminal 13 of amplifier IC1 and ground, is a coupling capacitor.

The signal loss sensing circuit comprises an audio amplifier circuit and an integrator circuit which causes solenoid coil 17B to be de-energized, thereby resulting in increased fuel flow, if there is a loss of signal from detonation transducer 15. Under normal engine running conditions, the signal at point 34 from the transducer 15 is sufficiently large to generate a large output signal at point P to produce a negative bias on the resistor R8. This bias causes the inverting input at terminal 4 to be at a lower voltage than the non-inverting input at terminal 5 of amplifier IC1, thus causing transistor Q2 to be turned on to energize solenoid coil 17B and thereby leaning out the fuel mixture for engine 10.

The audio amplifier circuit comprises a PNP transistor Q1 which has its emitter-collector circuit connected in series with an R-C circuit, comprising a resistor R6 and a capacitor C3, and a resistor R7 across the reference voltage source, i.e., between pin 6 and ground. The base terminal b of transistor Q1 is connected to a point O in a voltage divider network comprising resistors R4 and R5 which are connected across the reference voltage source, i.e., between pin 6 and ground. Point O is coupled by a capacitor C2 to detonation input signal terminal 34.

The integrator circuit includes a capacitor C4 and a resistor R8 which are connected in series with each other between collector terminal c of transistor Q1 and point P. A diode D2, which provides a negative bias, is connected to a point S, between capacitor C4 and resistor R8, and ground. A summing network is formed with the resistors R8, R9 and R10.

In the event of failure of detonation transducer 15, the signal from transistor Q1 will be zero (0) and the bias level on the inverting input terminal 4 of amplifier IC1 will become higher than that at the non-inverting input terminal 5. The effect of this is to turn off amplifier IC1, to turn off transistor Q2, to cause solenoid coil 15 to de-energize, to cause valve 14 to assume fully open condition, and to increase fuel flow (i.e., enrichen the mixture).

Under normal operations, when the detonation level becomes large enough to produce a detonation signal at point 34, the signal that is coupled through capacitor C1 will forward bias diode D1 thus increasing the bias level on the inverting input terminal 4 of amplifier IC1, thereby causing amplifier IC1 to turn off, to cause transistor Q2 to turn off, to cause solenoid 15 to de-energize, to cause valve 14 to assume fully open condition, and to increase fuel flow, thereby enrichening the mixture and thereby decreasing detonation in engine 10.

When engine 10 is started, the signal at 34 is relatively weak but is amplified sufficiently by the audio amplifier circuit so as to cause solenoid coil 15 to be energized and valve 14A to be partially closed.

As FIGS. 1 and 4 show, the controller 16 of the detonation control apparatus disclosed may be considered schematically as comprising a detonation transducer 15 providing an alternating current signal voltage at point 34; a signal conditioning circuit 52 which includes the detonation sensing circuit and the fail-safe circuits and provides a d.c. on-off signal to the valve control (or power amplifier) circuit 54. Such an on-off digital signal at transistor Q2 is sufficient to operate the on-off solenoid coil 17B for the two-position valve 17A to cause the latter to assume either a partially open (normal) or fully open (rich) position.

Since the use of an on-off type solenoid valve assembly such as 17 limits fuel regulation to two conditions, i.e., partial and full fuel flow, oscillation in engine r.p.m. can result in certain installations or situations. Such oscillation can be overcome by the use of a metering or proportional valve which varies the fuel flow proportionately in response to the level of detonation.

Figure 5:
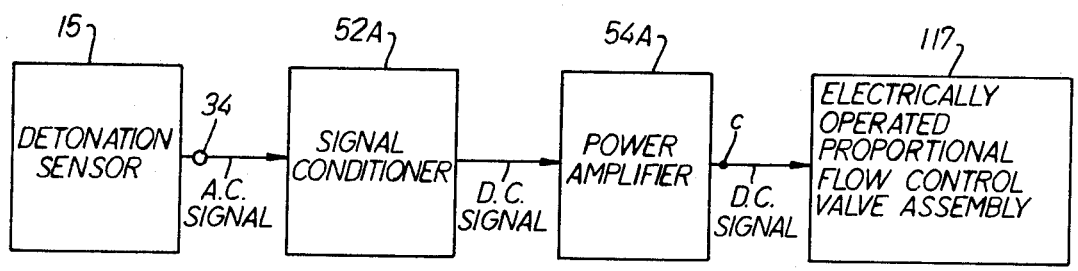
FIG. 5 is a block diagram of another embodiment of the invention.

Thus, FIG. 5 shows schematically another embodiment of the invention wherein an electrically operated metering or proportional flow control valve assembly 117 is provided, which is understood to be variable between partially open and fully open positions in response to a variable voltage or variable current signal supplied from a power amplifier circuit 54A which, for example, includes an operational amplifier of a type wherein a d.c. output signal of varying magnitude (i.e., voltage or current) is supplied to operate the flow control valve assembly 117. In such an arrangement, the extent to which the valve is open is proportional to the level of detonation.

Figure 6:
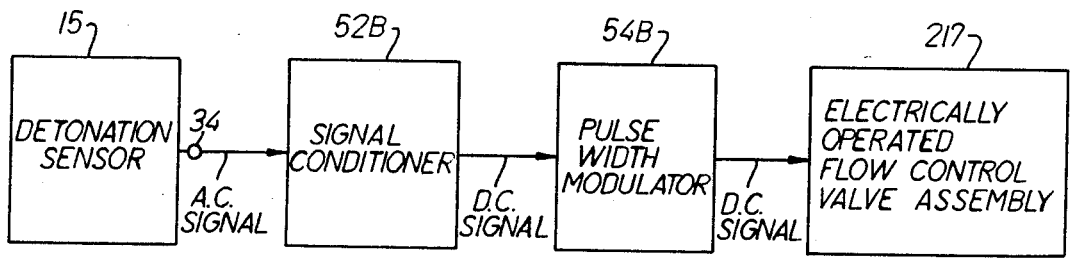
FIG. 6 is a block diagram of still another embodiment of the invention.

FIG. 6 shows schematically still another embodiment of the invention wherein a flow control valve assembly 217, similar to 117, is operated in response to pulses produced by a pulse width modulator 54B. The frequency of the duration of the pulses is proportional to the level of detonation.

I claim:

1. Detonation control apparatus for an internal combustion engine which is supplied with a mixture of fuel and air comprising:
    (A) an electrically operated valve operable to regulate the proportion of fuel to air in the mixture supplied to said engine;
    (B) a transducer for sensing engine detonation and for providing an electrical signal having a value related to detonation magnitude;
    (C) electrical control means responsive to said signal for operating said valve to maintain the proportion of fuel to air in said mixture below a predetermined proportion when detonation is below a predetermined magnitude and to increase the proportion of fuel to air above said predetermined proportion when detonation exceeds said predetermined magnitude; and
    (D) power supply means for energizing said electrically operated valve and said electrical control means;
    said control means being further responsive to decrease of signal magnitude of said signal below a predetermined value to increase the proportion of fuel to air above said predetermined proportion even if detonation is below said predetermined magnitude.

2. Detonation control apparatus for an internal combustion engine which is supplied with a mixture of fuel and air comprising:
    a valve having electrically operable means and operable to regulate the proportion of fuel to air in said mixture supplied to said engine;
    a transducer for sensing the presence or absence of engine detonation and for providing an electrical signal having a value which is related to detonation magnitude;
    electrical control means responsive to said signal for operating said electrically operable means for said valve to maintain a predetermined proportion of fuel to air in said mixture when detonation is below a predetermined magnitude and to increase the proportion of fuel to air above said predetermined proportion when detonation is at or exceeds said predetermined magnitude;
    and electrical power supply means for said electrical control means and for said electrically operable means;
    said electrical control means including:
    a first transistor in circuit between said electrical power supply means and said electrically operable means for said valve; an operational amplifier for controlling said first transistor, said operational amplifier having first and second input terminals and an output terminal connected to said first transistor;
    a first circuit connected between said electrical power supply means and said first input terminal and tending to cause said operational amplifier and said transistor to operate said electrically operable means to cause said valve to maintain the proportion of fuel to air at said predetermined proportion when detonation is below said predetermined magnitude;
    a second circuit connected between said transducer and said second input terminal and tending to effect the bias on said second input terminal to cause said operational amplifier and said first transistor to operate said electrically operable means to cause said valve to increase the proportion of fuel to air above said predetermined proportion when detonation reaches or exceeds said predetermined magnitude;
    a third circuit including a capacitor connected to said electrical power supply means and to said second input terminal and tending to effect the bias on said second input terminal to cause said operational amplifier said first transistor to operate said electrically operable means to cause said valve to increase the proportion of fuel to air above said predetermined proportion in the event of loss of power from said power supply means to said first terminal of said operational amplifier;

and a fourth circuit including an audio amplifier circuit and an integrater circuit connected between said transducer and said second input terminal and tending to effect the bias on said second input terminal to cause said operational amplifier and said first transistor to operate said electrically operable means to cause said valve to increase the proportion of fuel to air above said predetermined proportion whenever said electrical signal from said transducer is absent.

3. Detonation control apparatus for an internal combustion engine which is supplied with a mixture of fuel and air comprising:
  (A) an electrically operated valve to regulate the proportion of fuel to air in said mixture supplied to said engine;
  (B) a transducer for providing an electrical signal related to the magnitude of detonation in said engine;
  (C) electrical control means responsive to said signal for operating said valve to increase the proportion of fuel to air when detonation exceeds a predetermined magnitude;
  (D) a signal loss detecting circuit responsive to said signal to cause said electrical control means to operate said valve to increase the proportion of fuel to air whenever said signal from said transducer is below a predetermined value; and
  (E) a power supply means for energizing said electrically operated valve, said electrical control means, and said signal loss detecting circuit.

4. The detonation control apparatus defined in claim 1 or 3 wherein said valve is responsive to loss of power from said power supply to increase the proportion of fuel to air in the mixture supplied to said engine.

5. Detonation control apparatus for an internal combustion engine which is supplied with a mixture of fuel and air comprising:
  (A) a valve having electrically operable means and operable to regulate the proportion of fuel to air in said mixture supplied to said engine;
  (B) a transducer for sensing the presence or absence of engine detonation and for providing an electrical signal having a value which is related to detonation magnitude;
  (C) electrical control means responsive to said signal for operating said electrically operable means for said valve to maintain the proportion of fuel to air below a predetermined proportion when detonation is below a pedetermined magnitude and to increase the proportion of fuel to air above said predetermined proportion when detonation exceeds said predetermined magnitude; and
  (D) electrical power supply means for said electrical control means and for said electrically operable means;

said electrical control means including:
  (1) a power amplifier in circuit between said electrical power supply means and said electrically operable means for said valve;
  (2) a comparator for controlling said power amplifier, said comparator having first and second input terminals and an output terminal connected to said power amplifier;
  (3) a biasing circuit connected between said electrical power supply means and said first input terminal and tending to cause said comparator and said power amplifier to operate said electrically operable means to cause said valve to maintain the proportion of fuel to air below said predetermined proportion when detonation is below said predetermined magnitude;
  (4) a detonation sensing circuit connected between said transducer and said second input terminal and tending to effect the bias on said second input terminal to cause said comparator and said power amplifier to operate said electrically operable means to cause said valve to increase the proportion of fuel to air above said predetermined proportion when detonation reaches or exceeds said predetermined magnitude; and
  (5) a signal loss detecting circuit connected between said transducer and said second input terminal and tending to effect the bias on said second input terminal to cause said comparator and said power amplifier to operate said electrically operable means to cause said valve to increase the proportion of fuel to air above said predetermined proportion whenever said electrical signal from said transducer is below a predetermined value.

* * * * *